June 11, 1957  N. A. DE BRUYNE  2,795,686
THERMOSTATS
Filed Sept. 22, 1955  2 Sheets-Sheet 1
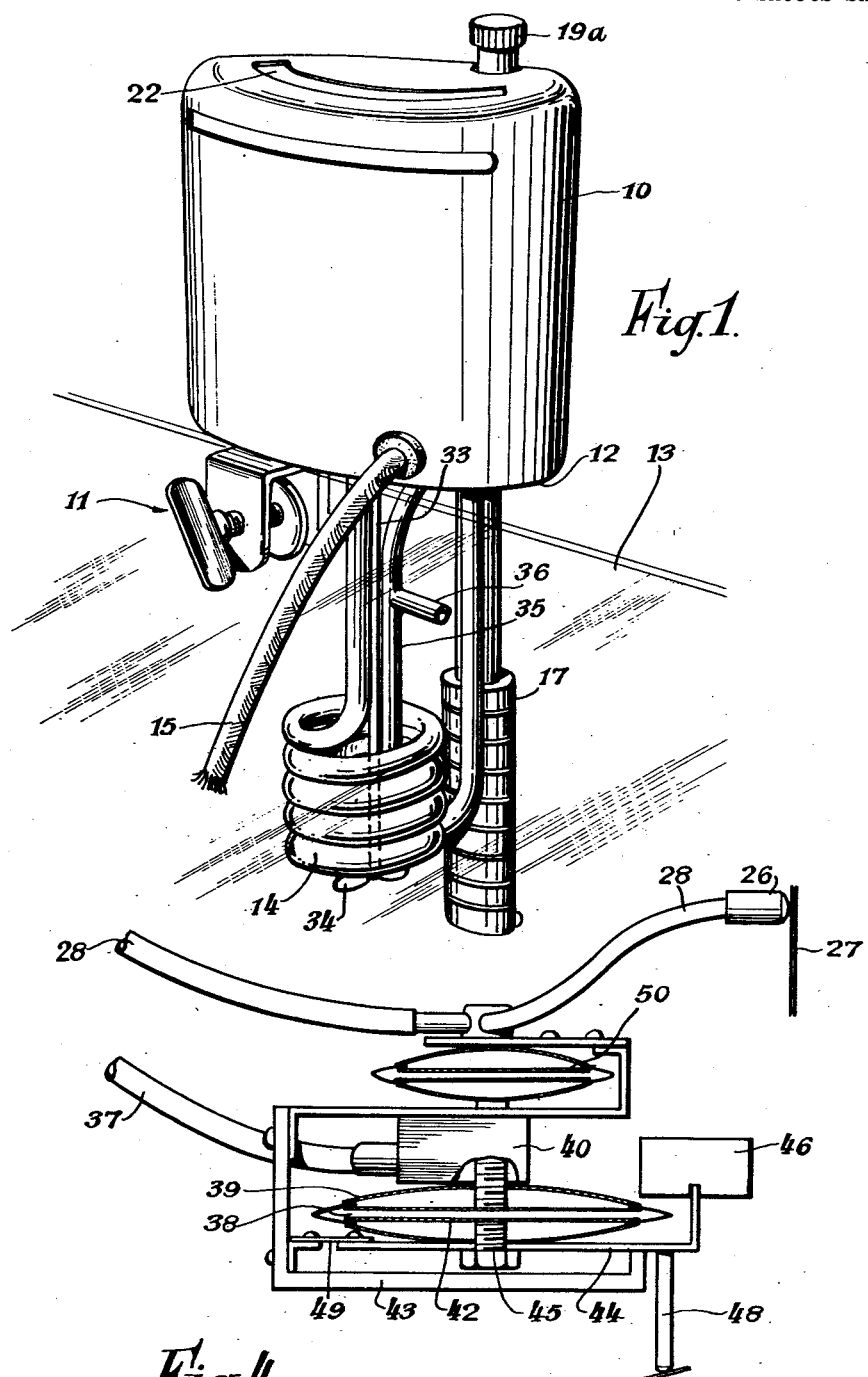
INVENTOR
NORMAN ADRIAN DE BRUYNE
BY
ATTORNEY

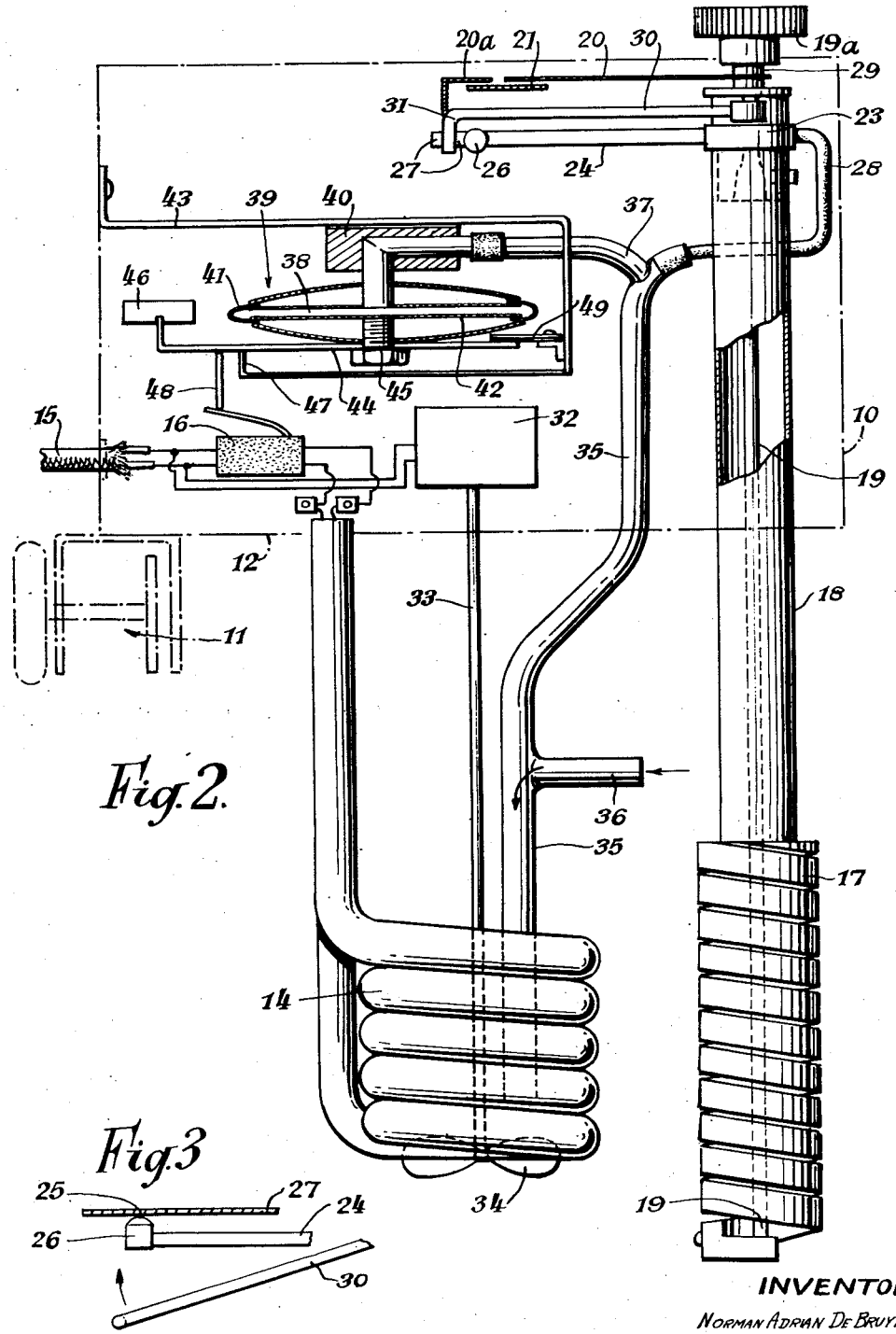

United States Patent Office 2,795,686
Patented June 11, 1957

2,795,686

THERMOSTATS

Norman A. De Bruyne, Duxford, England, assignor to Techne (Cambridge) Limited, Duxford, England, a British company Application September 22, 1955, Serial No. 535,921

10 Claims. (Cl. 219—41)

This invention relates to thermostatic devices for maintaining the temperature of a heated liquid at a desired value. Such devices include a temperature sensing element which is adapted to be immersed in the liquid and which may comprise a rod, tube, or bimetallic coil, the effect of a temperature change on the sensing element being used for the control of the heating unit.

The present invention is particularly but not exclusively concerned with electrical heating units. Hithertofore, it has been proposed to control such heating units by the temperature sensing element through electronic and other circuits. Such control circuits usually include thermionic valves and although generally satisfactory they have the disadvantage that a valve or other part of the circuit may fail at a critical moment. Other control arrangements of a mechanical nature have also been suggested, one of which operates by compressed air under the control of a temperature recording instrument. This latter arrangement has the disadvantage of requiring a separate source of compressed air which is generally inconvenient and expensive to maintain.

The present invention has therefore for its object the provision of an improved thermostatic device having a control arrangement which avoids the above disadvantages and which is more accurate and sensitive in operation.

A further object is to provide a mechanical control arrangement which is entirely contained within the heating unit.

According to the present invention there is provided a heating unit having a thermostatic device for maintaining the temperature of a heated liquid at a desired value, wherein the thermostatic device is suction operated, the suction being provided by the motion of the liquid which is being maintained at the desired temperature.

In a preferred construction the thermostatic device forms a self-contained unit with the heating means. The heating means preferably comprises an electrical heating element such as a coil for immersion in the liquid and the associated electrical circuit includes a switch controlled by a pressure responsive element such as bellows through a switch actuating arm normally urged to the switch open position so that the heating coil is inoperative.

The bellows is preferably connected internally with a circulating tube through which the liquid is moved by a circulating impeller. The suction in the tube is controlled by a temperature setting device so that when a desired temperature is reached the suction is destroyed and the heating coil rendered inoperative. The temperature setting device preferably includes a port connected with the circulating tube and normally closed by a valve device. The valve device is however engageable by an actuating member under the control of a temperature sensitive element to open the port to atmosphere when a temperature selected by the temperature setting device is attained.

In order that the invention may be clearly understood the preferred embodiment will now be described by way of example with reference to the accompanying drawings, in which:

Figure 1 is a perspective view of a self-contained heating and thermostatic unit according to the invention;

Figure 2 is a somewhat diagrammatic view of the mechanism of the unit;

Figure 3 is a plan view of the suction control portion of the mechanism; and

Figure 4 is a modified bellows assembly.

Referring now to the drawings and in particular to Figure 1 it will be seen that the unit is electrically operated and comprises a main casing 10 having a clamp 11 on its lower side 12 for attaching the unit to the side 13 of a bath containing the liquid to be heated and maintained at a desired temperature. The casing 10 contains the various thermostatic controls for the heating element and the whole unit is entirely self-contained as will be apparent from the following description.

The lower side 12 of the casing 10 also supports a conventional tubular heating coil 14 containing an electrical heating element (not shown), the heating element being connected within the casing to an electrical supply line 15 through a micro-switch 16 (Figure 2).

The temperature sensitive element comprises a bimetallic helix 17 secured at its upper end to the lower end of a tubular member 18 extending from the lower side 12 of the casing. The lower end of the helix 17 is connected to a rod 19 extending centrally within the tubular member 18. The tubular member 18 extends upwardly through the casing 10 (see Figure 2) and at its upper end it supports the temperature setting controls. The temperature setting controls include a knob 19a rotation of which moves a pointer 20 angularly across a temperature scale 21 viewed through an inspection window 22 (see Figure 1). Rotation of the knob 19a further rotates a header unit 23 rotatably mounted on the top of the tubular member 18 and supporting a tube 24. The tube 24 has a port or restricted orifice 25 at its outer end (see Figure 3) formed in a jet portion 26 of the tube extending at right angles thereto. The port 25 is normally closed by a flap 27 which is pivoted on the tube 24 and may be spring urged to hold the flap against the port. The header unit 23 provides a passageway connecting the tube 24 with a flexible tube 28 to be hereinafter described.

The rod 19 extends rotatably through the header unit 23 and is journalled at its upper end in the shank 29 of the knob 19a. The rod 19 rigidly carries an arm 30 having a downwardly extending portion 31 adapted to engage the flap 27 as the rod 19 and arm 30 rotate. The tube also carries a pointer 20a.

An electric motor 32 is mounted in the casing 10 and is connected through a drive shaft 33 with an impeller 34 located in the lower part of the heating coil 14. The motor 32 is continually energised once the unit is switched on.

A tube 35 extends downwardly from the casing 10 into the heating coil 14 to a position just above the impeller 34 (see Figure 2). An open-ended branch tube 36 extends from the tube 35 to a position preferably but not necessarily adjacent to the helix 17. It will be appreciated that when the impeller 34 is actuated a flow of liquid will take place in the circulating tube 35 the liquid entering the branch tube 36 and being drawn downwardly by the impeller. The flow of liquid produces a reduced pressure in the upper part of the tube 35 so long as the port 25 is closed by the flap 27 and this reduced pressure or suction is used to control the micro-switch 16 of the heating element 14 as will now be described.

The upper end of the tube 35 is connected to the flexible tube 28 and also to a tube 37 connected to the chamber 38 of a bellows assembly 39 through a connector block 40. The bellows assembly 39 is circular with an outer peripheral portion 41 of a plastic such as polythene. The inner edges of the polythene portion of the bellows are secured between a pair of brass discs 42, there being a pair of discs forming each wall of the bellows 39.

The connector block 40 of the bellows assembly is supported from a structure 43 connected to the side wall of the casing 10. The lower pair of brass discs 42 has an actuating arm 44 connected thereto by a screw 45, the arm having a weight 46 thereon normally urging the arm into engagement with a stop 47 on the structure in which position the arm opens the micro-switch 16 through a push-rod 48. The arm 44 is connected to the structure 43 through a resilient strip 49.

In use the unit is fixed to the side of a bath containing liquid the temperature of which is to be maintained at a desired value. The knob 19a is rotated to move the pointer 20 to a desired temperature indication as shown on the associated scale 21. The movement of the knob 19a also adjusts the tube 24 and its associated flap 27. The unit is switched on which starts the impeller 34 to produce a reduced pressure in the tubes 28, 35 and 37 as the liquid circulates. The reduced pressure collapses the bellows assembly 39 which moves the arm 44 upwardly against the action of the weight 46 and so allows the switch 16 to close and complete the circuit to the heating coil 14. As the temperature of the liquid rises the bi-metallic coil rotates the central spindle 19 and therefore the arm 30 and its pointer 20a. When the two pointers 20, 20a are in line at the desired temperature the actuating arm 30 engages the flap 27 and lifts it off the jet portion 26 to uncover the port 25 to atmosphere. The reduced pressure in the tubes 28, 35 and 37 is thus destroyed and the bellows assembly 39 therefore returns to its natural position and allows the weighted arm 44 to fall and open the micro-switch 16 to switch off the heating coil 14. As the temperature drops the bi-metallic helix 17 reverses itself and removes the arm 30 from the flap 27 to allow the flap 27 to seal the port 25 once again and so restart the heating coil. The cycle is continually repeated while the instrument is in use.

It has been found that a six inch head of water is sufficient to operate the control described and to exert a force equivalent to lifting an eight ounce weight. The control is entirely self-contained within the heating unit and is practically fool-proof as there are few working parts.

In Figure 4 a modified control unit is shown. In this modified arrangement the connector block 40 includes a change-over valve such as a ball valve under the control of second bellows assembly 50 having a construction similar to that of the assembly 39. The bellows 50 is connected into the tube 28 and during heating is collapsed to hold the valve in the block 40 open to retain the bellows 39 also collapsed. When the reduced pressure in the tube 28 is destroyed the bellows 50 assumes its natural position and closes the valve in the block 40. The bellows 39 thus slowly returns to its natural position to open the micro-switch 16 and thus gives a more accurate control of the heating of the liquid.

I claim:

1. In a thermostat device for maintaining the temperature of a liquid in a container by controlling the energy supplied to a heating unit which is adapted to be immersed in the liquid of the container, the improved construction comprising a housing adapted to be attached to said container so as to hold the heating means in suspended position in said liquid, liquid moving means extending from said housing to a position adjacent the heating means for setting in motion the liquid to be heated so as to successively move different parts of said liquid into contact with the heating unit, suction means operable by the liquid movement to create a suction, said suction means having one end thereof suspended within the portion of the liquid which is set in motion by the liquid moving means, a switch device for controlling the energy supplied to the heating unit, means operable from the suction means to activate said switch device, a temperature sensitive element at least partially suspended in said container from said housing, means operable by said temperature sensitive element to render the suction means inoperable when the liquid of the container has a predetermined desired temperature.

2. In the thermostat device as claimed in claim 1 wherein the means operated by the suction means to control the switch device is a pressure responsive element.

3. In the thermostat device as claimed in claim 2 wherein said switch device is normally urged to its switch open position and wherein the suction means operates the pressure responsive element to hold the switch in closed position.

4. In the thermostat device as claimed in claim 2 wherein said pressure responsive element is a bellows assembly connected internally to said suction means.

5. In the thermostat device as claimed in claim 1, wherein said suction means comprises a tube having two spaced openings in the portion which is suspended below the liquid level of said container whereby flow of liquid between the openings produced by the liquid moving means creates a suction in the portion of the tube above the level of the liquid.

6. In the thermostat device as claimed in claim 5 wherein one of said two openings in the suction tube is adjacent the heating means and the other of said openings is adjacent the temperature sensitive element.

7. In the thermostat device as claimed in claim 1 comprising manually adjustable means for adjusting the temperature at which the temperature sensitive element renders the suction means inoperable.

8. In the thermostat device as claimed in claim 5 wherein said suction tube includes a normally closed port adjacent the portion above the liquid level of the container and wherein the means operable by the temperature sensitive device to render the suction means inoperative comprises means for opening said port.

9. In the thermostat device as claimed in claim 1, a motor within said housing for continuously operating the liquid moving means.

10. In a thermostat device for maintaining the temperature of a liquid in a container by controlling the energy supplied to an electrical heating unit which is adapted to be immersed in the liquid of the container, said device including a motor driven liquid moving means with the motor thereof connected directly to a source of electricity, switch means for connecting the electrical heating unit to a source of electricity and a heat sensitive element for controlling the operation of the switch, the improved construction comprising a tubular suction device operable to provide a suction by the movement of liquid produced by the liquid moving means, said tubular suction device being connected to normally hold the electric heating switch in closed position, and means connected to the temperature sensitive element to inactivate said suction device when the liquid being heated reaches a predetermined temperature.

References Cited in the file of this patent

UNITED STATES PATENTS

| | | |
|---|---|---|
| 1,037,369 | Thompson | Sept. 3, 1912 |
| 1,920,284 | Wells | Aug. 1, 1933 |
| 2,044,573 | Hornberger | June 16, 1936 |
| 2,164,282 | Morris | June 27, 1939 |